United States Patent
Bilbrey et al.

(10) Patent No.: US 7,616,829 B1
(45) Date of Patent: Nov. 10, 2009

(54) REDUCING UNDESIRABLE BLOCK BASED IMAGE PROCESSING ARTIFACTS BY DC IMAGE FILTERING

(75) Inventors: Brett Bilbrey, Sunnyvale, CA (US); Alexei V. Ouzilevski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 713 days.

(21) Appl. No.: 10/697,447

(22) Filed: Oct. 29, 2003

(51) Int. Cl.
*G06K 9/40* (2006.01)
*G06K 9/38* (2006.01)
*H04N 5/00* (2006.01)

(52) U.S. Cl. .................. 382/268; 382/260; 382/261; 382/266; 382/270; 382/272; 348/610

(58) Field of Classification Search .............. 382/233, 382/254, 260, 261, 268, 270, 275; 348/241, 348/254, 607, 625
See application file for complete search history.

(56) References Cited

U.S. PATENT DOCUMENTS

| | | | |
|---|---|---|---|
| 4,577,235 A * | 3/1986 | Kannapell et al. ........... 358/462 |
| 5,012,333 A * | 4/1991 | Lee et al. .................... 358/520 |
| 5,023,919 A * | 6/1991 | Wataya ....................... 382/263 |
| 5,454,051 A | 9/1995 | Smith |
| 5,590,064 A | 12/1996 | Astle |
| 5,629,778 A | 5/1997 | Reuman |
| 5,677,736 A | 10/1997 | Suzuki et al. |
| 5,742,355 A * | 4/1998 | De Haan et al. ............. 348/607 |
| 5,774,599 A * | 6/1998 | Muka et al. ................. 382/254 |
| 5,796,875 A * | 8/1998 | Read .......................... 382/261 |
| 6,028,967 A | 2/2000 | Kim et al. |
| 6,035,065 A * | 3/2000 | Kobayashi et al. .......... 382/201 |
| 6,064,776 A * | 5/2000 | Kikuchi et al. .............. 382/260 |
| 6,151,420 A | 11/2000 | Wober et al. |
| 6,215,425 B1 | 4/2001 | Andrews et al. |
| 6,240,135 B1 | 5/2001 | Kim |
| 6,404,361 B2 | 6/2002 | Andrews et al. |
| 6,427,031 B1 * | 7/2002 | Price .......................... 382/264 |
| 6,539,060 B1 * | 3/2003 | Lee et al. ................ 375/240.29 |
| 6,792,152 B1 * | 9/2004 | Shibata et al. .............. 382/239 |
| 6,876,778 B2 * | 4/2005 | Lin et al. .................... 382/266 |
| 6,922,492 B2 * | 7/2005 | Yu et al. ..................... 382/260 |
| 6,983,079 B2 * | 1/2006 | Kim .......................... 382/275 |
| 7,003,174 B2 * | 2/2006 | Kryukov et al. ............ 382/266 |
| 7,050,504 B2 * | 5/2006 | Joch et al. .............. 375/240.26 |

OTHER PUBLICATIONS

List et al., Adaptive Deblocking Filter, IEEE Transactions on Circuits and Systems for Video Technology, vol. 13 No. 7, Jul. 2003, pp. 614-619.*

(Continued)

*Primary Examiner*—Brian P Werner
*Assistant Examiner*—Jose M Torres
(74) *Attorney, Agent, or Firm*—Fenwick & West LLP

(57) ABSTRACT

A post-processing manager provides reconstructed block based picture post-processing that is uncoupled from picture decoding by dividing a reconstructed image that was encoded using block based processing into non-overlapping blocks, creating a DC image by computing the DC value of each block, creating a zero mean image by subtracting the DC value of each block from the corresponding pixels of that block, filtering the DC image and adding the filtered DC image to the zero mean image. A weak filtering operation can be applied to reduce blocking artifacts, and a strong filtering operation can be applied to smooth luminance transitions.

24 Claims, 6 Drawing Sheets

OTHER PUBLICATIONS

Kim et al., A Deblocking Filter with Two Separate Modes in Block-Based Video Coding, IEEE Transactions on Circuits and Systems for Video Technology, vol. 9 No. 1, Feb. 1999, pp. 156-160.*

Abouelela et al., "A Statistical Approach for Textile Fault Detection", IEEE International Conference on Systems, Man, and Cybernetics 2000, vol. 4, Oct. 8-11, 2000, pp. 2857-2862.*

Gunturk, Bahadir K. et al., "Multiframe Blocking-Artifact Reduction for Transform-Coded Video," *IEEE Transactions on Circuits and Systems for Video Technology*, vol. 12, No. 4, Apr. 2002; pp. 276-282.

Kim, Sung Deuk et al., "A Deblocking Filter with Two Separate Modes in Block-Based Video Coding," *IEEE Transactions on Circuits and Systems for Video Technology*, vol. 9, No. 1, Feb. 1999; pp. 156-160.

Lai, Yung-Kai et al., "Image Enhancement for Low Bit-rate JPEG and MPEG Coding via Postprocessing," *SPIE*, vol. 2727, 1996; pp. 1484-1494.

Park, Hyun Wook and Lee, Yung Lyul, "A Postprocessing Method for Reducing Quantization Effects in Low Bit-Rate Moving Picture Coding," *IEEE Transactions on Circuits and Systems for Video Technology*, vol. 9, No. 1, Feb. 1999; pp. 161-171.

Segall, C. Andrew and Katsaggelos, Aggelos K., "Pre- and Post-Processing Algorithms for Compressed Video Enhancement," From the Proceedings of the 34$^{th}$ Asilomar Conference on Signals and Systems, Pacific Grove, CA, 2000; 5 pages.

Shen, Mei-Yin and Kuo, C.-C. Jay, "Review of Postprocessing Techniques for Compression Artifact Removal," *Journal of Visual Communication and Image Representation*, vol. 9, No. 1, Mar. 1998; pp. 2-14.

Xiong, Zixiang et al., "A Deblocking Algorithm for JPEG Compressed Images Using Overcomplete Wavelet Representations," *IEEE Transactions on Circuit and Systems for Video Technology*, vol. 7, No. 2, Apr. 1997; pp. 433-437.

\* cited by examiner

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |

FIG. 6

REDUCING UNDESIRABLE BLOCK BASED IMAGE PROCESSING ARTIFACTS BY DC IMAGE FILTERING

BACKGROUND

1. Field of Invention

The present invention relates generally to block based image processing, and more specifically to reducing undesirable artifacts associated therewith by isolating and filtering the DC image.

2. Background of Invention

Reconstructed pictures that were encoded using block based picture coding (e.g., JPEG, MPEG2, MPEG4) often contain perceptually annoying blocking artifacts and/or edgy luminance transitions in the flat regions. For example, during a low bit rate MPEG coding in an application such as video conferencing, the reconstructed data often exhibits visible compression artifacts. Reconstructed picture quality can be enhanced by means of post-processing an image with a de-blocking low pass filter. Some known post-processing methods use coded bit stream characteristics to predict the amount of artifacts and to select the strength of the filter to use. However, it would be desirable for post-processing to be uncoupled from the decoding, so that the post-processing could be reused in any block based coding application. For post-processing to be uncoupled from the decoding, the post processing methodology could not use quantization scales or discrete cosine transform (DCT) domain data, which are available at decoding time and used by prior art methods.

Additionally, prior art methods apply post-processing to either pixels or DCT coefficients of eight by eight blocks. Pixel domain processing is computationally expensive, because of the size and complexity of the pixel array. Pixel processing also does not robustly preserve image detail. DCT domain processing requires computationally expensive DCT and IDCT operations. DCT domain processing also requires compressed picture data, and must be applied at the picture decoding stage. Furthermore, DC terms in the DCT domain are related to eight by eight blocks. Modifying DC terms of an eight by eight block generally does not achieve good detail preservation.

What is needed are reconstructed block based-picture post-processing methods, systems and computer program products that are uncoupled from picture decoding, and consequently do not use quantization scales or DCT domain data for mode decision and/or processing. Furthermore, it would be desirable for the post-processing to neither be applied to pixels nor to DCT coefficients of eight by eight blocks, as applying post-processing to either is computationally expensive, and does not adequately preserve image detail.

SUMMARY OF INVENTION

A post-processing manager provides reconstructed block based picture post-processing that is uncoupled from picture decoding by dividing a reconstructed image that was encoded using block based processing into non-overlapping blocks of a specified size, creating a DC image by computing the DC value of each block, creating a zero mean image by subtracting the DC value of each block from the corresponding pixels of that block, filtering the DC image and adding the filtered DC image to the zero mean image. A weak filtering operation can be applied to the DC image to reduce blocking artifacts, and a strong filtering operation can be applied to the DC image to smooth luminance transitions in flat regions.

Because the post-processing is based on filtering the local DC component of two-dimensional blocks, the present invention does not require DCT domain data or any compressed bit stream parameters. Thus, the present invention can be completely decoupled from image decoding, and thus can be reused in any block based coding application. Furthermore, because the post-processing manager isolates and filters the DC component of the image while preserving the high frequency data component as the zero mean image, detail preservation is very robust.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 6 is a block diagram, illustrating an example of determining whether to apply a strong filtering operation to a specific DC value, which proximate DC values to include in the strong filtering operation, as well as the strong filtering operation itself, according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
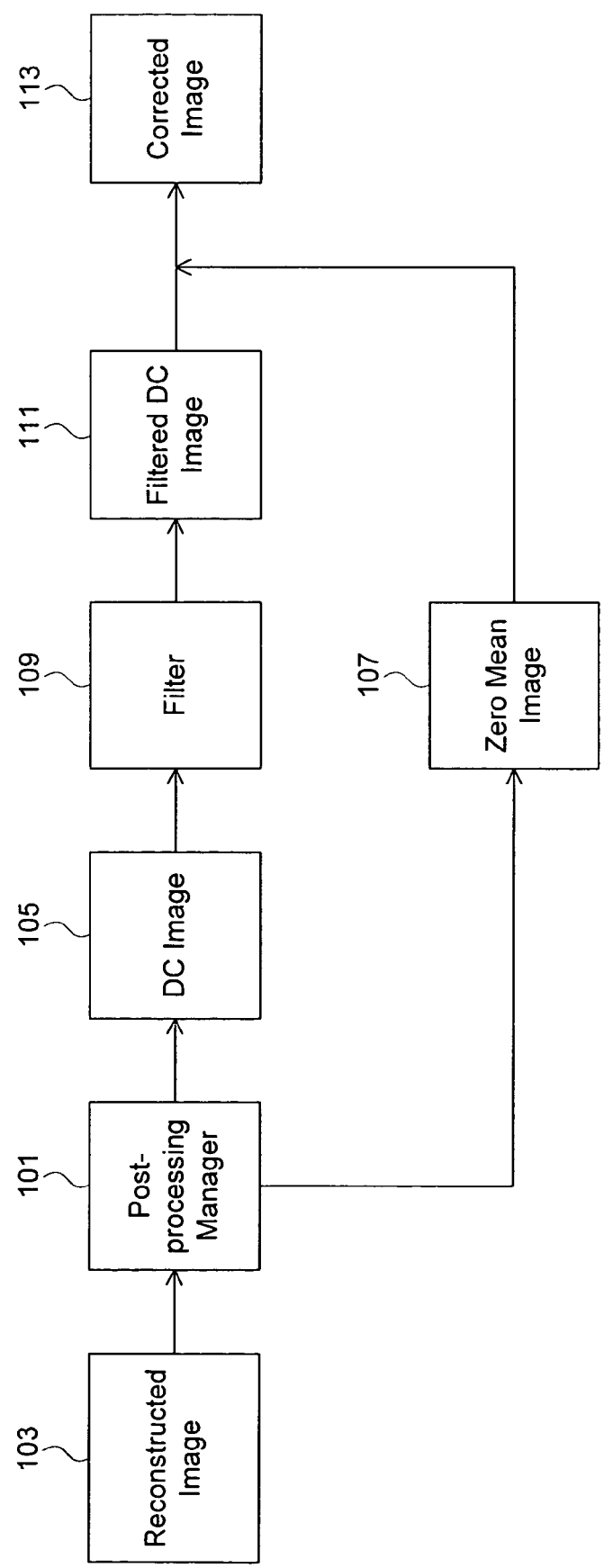
FIG. 1 is a block diagram, illustrating a high level overview of post-processing reconstructed pictures in order to reduce compression artifacts, according to some embodiments of the present invention.

FIG. 1 illustrates a high level overview of post-processing reconstructed pictures in order to reduce compression artifacts, according to some embodiments of the present invention. A post-processing manager 101 divides a reconstructed image 103 that was encoded using block based processing into non-overlapping blocks (non-overlapping blocks not illustrated in FIG. 1).

It is to be understood that although the post-processing manager 101 is illustrated as a single entity, as the term is used herein a post-processing manager 101 refers to a collection of functionalities which can be implemented as software, hardware, firmware or any combination of the three. Where a post-processing manager 101 is implemented as software, it can be implemented as a standalone program, but can also be implemented in other ways, for example as part of a larger program, as a plurality of separate programs, or as one or more statically or dynamically linked libraries.

The size of the non-overlapping blocks into which the post-processing manager 101 divides a reconstructed image 103 is a design choice, which can be specified as desired. In one embodiment, two by two blocks are used, but other values are possible, for example four by four, four by two, or two by four. The blocks are used to create a DC image 105 by computing the DC value of each block, as described below. Those of ordinary skill in the relevant art will understand in light of this specification that increasing the block size for which the DC value is computed reduces the size of the resulting DC array, and will thus reduce the required number of processing cycles. However, as the block size increases, detail preservation is lost.

The post-processing manager 101 creates a DC image 105 pertaining to the reconstructed image 103 by computing the DC value of each block. The post-processing manager 101 also creates a zero mean image 107 by subtracting the DC value of each block from the corresponding pixels of that block. The implementation mechanics for computing the DC value of each block, and for subtracting the DC value from the pixels of that block will be apparent to those of ordinary skill in the art in light of this specification.

The post-processing manager 101 filters the DC image 105 by applying at least one filter 109 to at least some of the DC values. A weak filtering operation can be applied to reduce blocking artifacts where necessary, and a strong filtering operation can be applied to smooth luminance transitions in flat regions as desired. The specifics of the weak and strong filtering operations, as well as the logic which is used to determine to which DC values to apply them, is discussed in detail below.

The post-processing manager adds the filtered DC image 111 to the zero mean image 107, thereby creating a corrected image 113, in which blocking artifacts are reduced and luminance transitions in flat regions are smoothed, as desired.

When reconstructed images 103 are processed according to the present invention, the blocking artifacts are mostly eliminated and the luminance transitions in the flat regions become smoother. This improves the overall quality of the pictures. Because the post-processing is based on filtering the local DC component of two-dimensional pixel blocks, the present invention does not require DCT domain data or any compressed bit stream parameters. Thus, the present invention can be completely decoupled from image decoding, and thus can be reused in any block based coding application. Furthermore, because the post-processing manager 101 isolates and filters the DC component of the image 101 while preserving the high frequency data component as the zero mean image 107, detail preservation is very robust.

Figure 2:
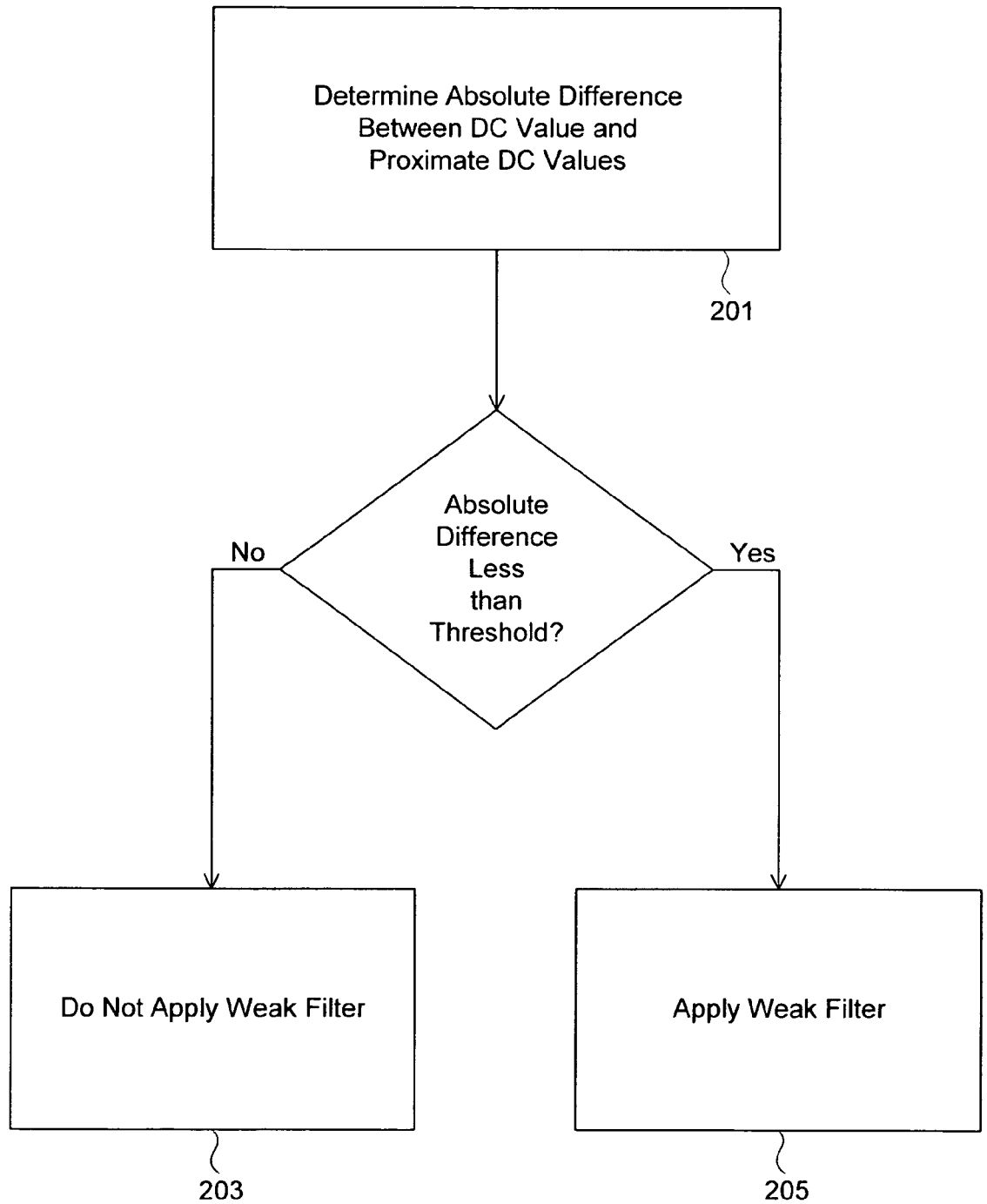
FIG. 2 is a flowchart, illustrating steps for determining whether to apply a weak filtering operation to a DC value to reduce blocking artifacts, according to some embodiments of the present invention.

FIG. 2 illustrates steps for the post-processing manager 101 to determine whether to apply a weak filtering operation to a DC value to reduce blocking artifacts, according to some embodiments of the present invention. It is desirable to only apply the weak filtering operation to blocks in which blocking artifacts need to be reduced. Therefore, for each DC value in the DC image 105, the post-processing manager 101 determines 201 the absolute difference between the DC value and each of a specified number of proximate DC values in the DC image. If the absolute difference between the DC value and each of the specified number of proximate DC values is not less than a specified threshold value, the post-processing manager concludes that blocking artifacts are not an issue for the corresponding block, and does not apply 203 the weak filtering operation to that DC value. However, where the absolute differences are all less than the threshold value, the post-processing manager 101 applies 205 the weak filtering operation to that DC value, in order to reduce blocking artifacts. The weak filtering operation itself is discussed in greater detail below.

It is to be understood that the number of proximate DC values that the post-processing manager 101 uses in the above described operations is a design variable, which can be specified as desired. In one embodiment, the specified number of proximate DC values is four, but other numbers are possible, and will be apparent to those of ordinary skill in the relevant art in light of this specification. It is also to be understood that the threshold difference value is a design variable, which can be specified as desired, based on the target level of blocking artifact reduction. Various values will be apparent to those of ordinary skill in the relevant art in light of this specification. Furthermore, it is to be understood that in other embodiments of the present invention, the post-processing manager 101 can utilize varied operations to determine whether to apply a weak filtering operation to a specific DC value. Various alternatives will be apparent to those of ordinary skill in the relevant art in light of this specification, for example only requiring that the absolute difference between the DC value and any of its proximate DC values be less than the threshold.

Figure 3:
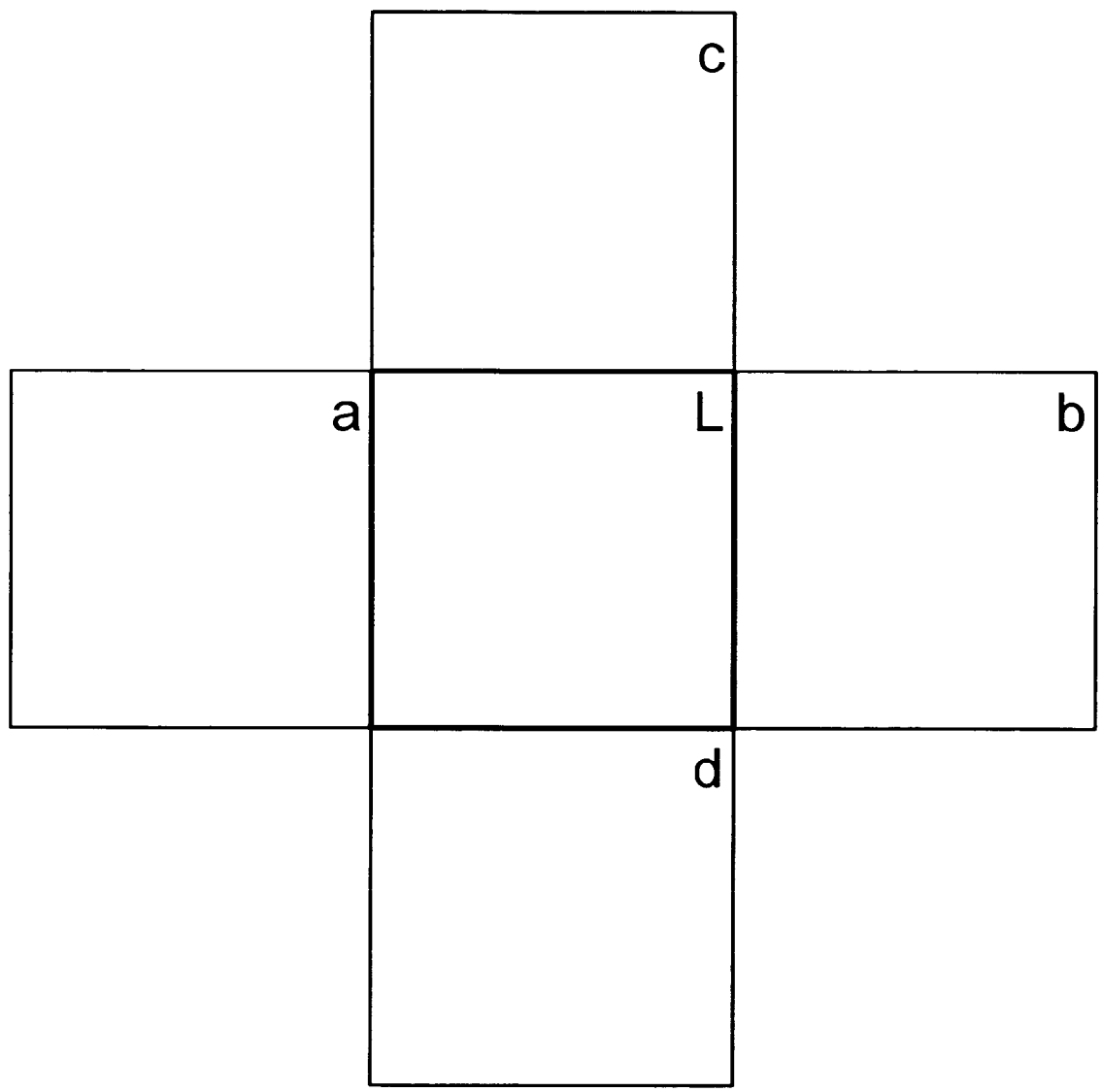
FIG. 3 is a block diagram, illustrating an example of determining whether to apply a weak filtering operation to a specific DC value, as well as the weak filtering operation itself, according to one embodiment of the present invention.

FIG. 3 illustrates an example of determining whether to apply a weak filtering operation to a specific DC value, as well as the weak filtering operation itself, according to one embodiment of the present invention. The post-processing manager 101 determines 201 the absolute difference between DC value L and each of its left, right, top and bottom neighboring DC values a, b, c and d. Only if the absolute difference between DC value L and each of DC values a-d and is less than the threshold is the weak filtering operation applied 205 to DC value L.

It is to be understood that the specific weak filtering operation to apply is a design choice. Various weak filtering operations are known, and can be applied as desired. One example of a weak filtering operation that is applied in some embodiments of the present invention is a five taps cross average filter. Where a five taps cross average filter is applied to the DC image 103 as described above, the processing requirements are 50% less than the known MPEG4 deblocking algorithm, and yet the perceptual quality of the result is comparable to the MPEG4 algorithm.

For the example illustrated in FIG. 3, determining whether to apply the filter, and applying a five taps cross average filter where appropriate, is illustrated by the pseudo code fragment in table 1, in which the threshold value is represented by the symbol "DCTh."

TABLE 1

If ( |a − L| < DCTh AND |b − L| < DCTh AND | c − L| < DCTh AND |d − L| < DCTh) THEN
   L = 1/5 * (a + b + c + d + L)

It will be apparent to those of ordinary skill in the relevant art in light of this specification that the post-processing manager 101 can use filtered DC values in subsequent filtering operations, both as proximate DC values used in order to determine whether to apply the weak filtering operation, as well in the application of the weak filter itself where appropriate.

Figure 4:
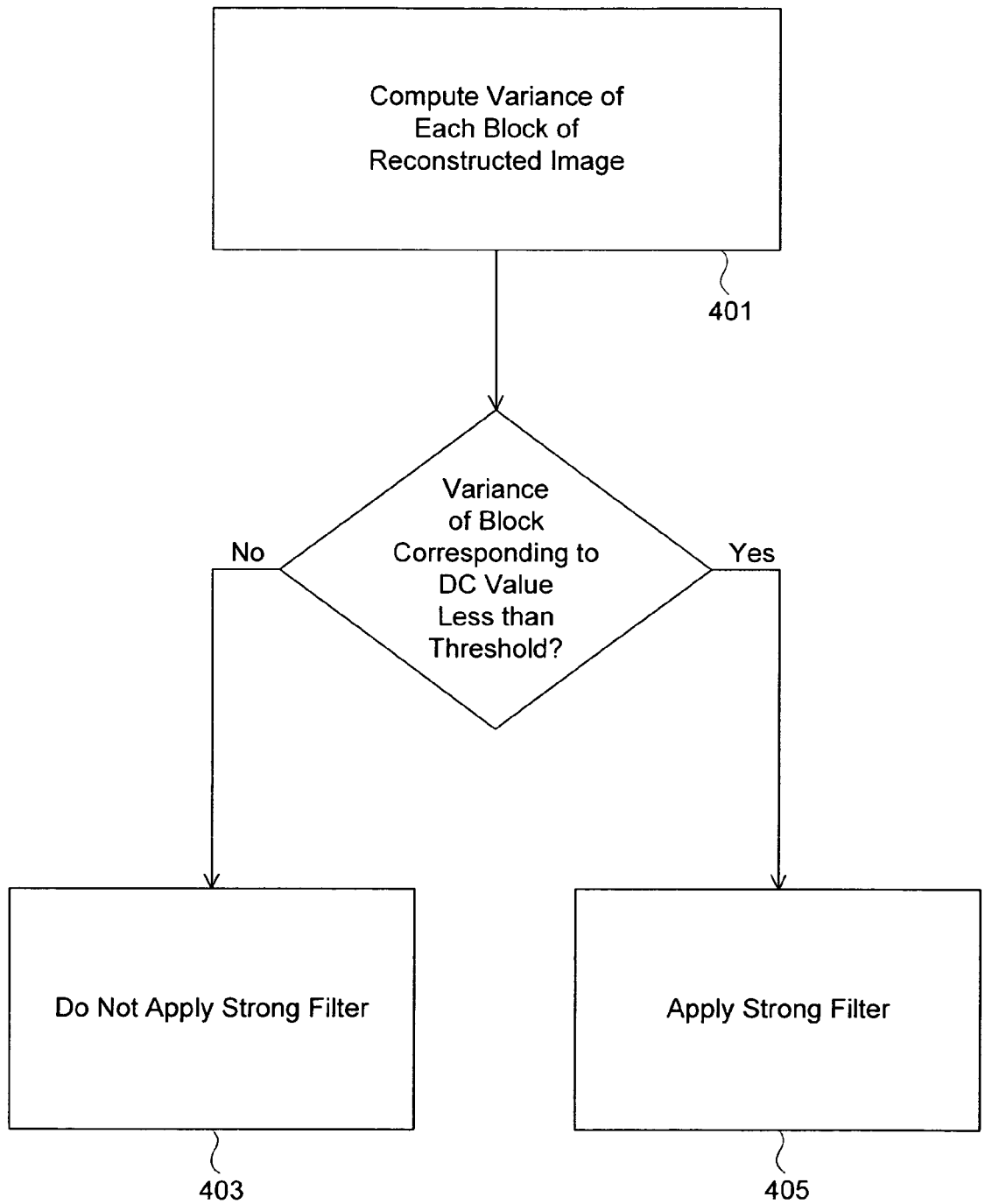
FIG. 4 is a flowchart, illustrating steps for determining whether to apply a strong filtering operation to a DC value in order to smooth luminance transitions in a flat region, according to some embodiments of the present invention.

FIG. 4 illustrates steps for the post-processing manager 101 to determine whether to apply a strong filtering operation to a DC value in order to smooth luminance transitions in a flat region, according to some embodiments of the present invention. It is desirable to only apply the strong filtering operation to blocks in flat regions. In order to identify the flat regions, the post-processing manager 101 computes 401 the variance of each block of the reconstructed image 103, the implementation mechanics of which will be readily apparent to those of ordinary skill in the relevant art in light of this specification. For each DC value in the DC image 105, the post-processing manager 101 determines whether the variance of the corresponding block is less than a variance threshold value. If the variance is not less then the threshold, the block is not within a flat region, and the post-processing manager 101 does not apply 403 the strong filter to the corresponding DC value. However, if the variance is less than the threshold, the post-processing manager applies 405 the strong filtering operation to the DC value. The strong filtering operation is discussed in greater detail below.

It is to be understood that the variance threshold value is a design variable, which can be specified as desired, based on the application environment. Various possible values will be apparent to those of ordinary skill in the relevant art in light of this specification.

Figure 5:
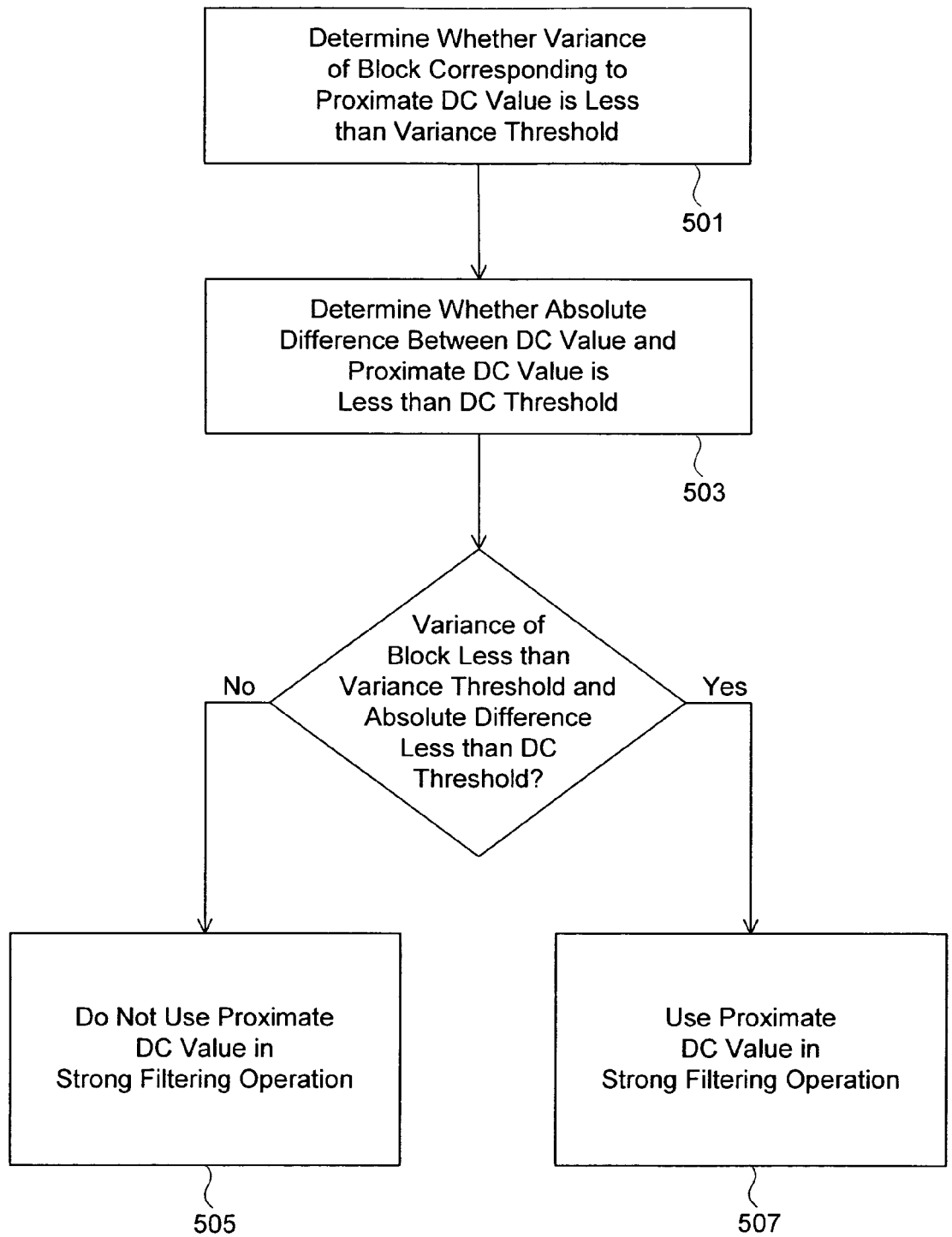
FIG. 5 is a flowchart, illustrating steps for applying an adaptive strong five by five average filter to a DC value, according to some embodiments of the present invention.

FIG. 5 illustrates steps for applying a strong filter in the form of an adaptive strong five by five average filter, according to some embodiments of the present invention. Once it has been determined that the variance of a block is below a specified threshold, it is desirable to determine which proximate blocks should be used in the strong filter operation to smooth luminance transitions, based on the variance of those blocks and the absolute difference between them and the block being filtered. Therefore, in the embodiments illustrated in FIG. 5, for a specified number of DC values proximate to the DC value to be filtered, the post-processing manager 101 determines 501, 503 whether the variance of the block corresponding to the proximate DC value is less than the specified variance threshold, and whether the absolute difference between the proximate DC value and the DC value to be filtered is less than a DC threshold value. If the variance of a block corresponding to a proximate DC value is not less than the variance threshold or the absolute difference between the DC value to be filtered and the proximate DC value is not less than the DC threshold, the post-processing manager 101 does not use 505 that proximate DC value in the strong filtering operation. Only if the variance of the block corresponding to the proximate DC value is less than the variance threshold and the absolute difference between the DC value and the proximate DC value is less than the DC threshold does the post-processing manager 101 use 507 that proximate DC value in the strong filtering operation.

It is to be understood that the number of proximate DC values that the post-processing manager 101 examines in the above described processing is a design variable, which can be specified as desired. In one embodiment, the specified number of proximate DC values is 24, but other numbers are possible, and will be apparent to those of ordinary skill in the relevant art in light of this specification. Some possible examples include eight, 48 and 80. Of course, the variance and DC threshold values are also design variables, which can be specified as desired based on various application environmental factors, such as the coding bit rate. Various possible values will be apparent to those of ordinary skill in the relevant art in light of this specification. Furthermore, it is to be understood that in other embodiments of the present invention, the post-processing manager 101 can utilize varied operations to determine whether to apply a strong filtering operation to a specific DC value, as well as whether to include a specific proximate DC value in the filtering operation. Various alternatives will be apparent to those of ordinary skill in the relevant art in light of this specification.

FIG. 6 illustrates an example of determining whether to apply a strong filtering operation to a specific DC value, which proximate DC values to include in the strong filtering operation, as well as the strong filtering operation itself, according to one embodiment of the present invention. In the embodiment illustrated in FIG. 6, the post-processing manager 101 determines whether the variance of the block corresponding to DC value 12 is less than the variance threshold. If so, the post-processing manager applies 405 the strong filtering operation to DC value 12. In the embodiment illustrated in FIG. 6, the specified number of proximate values is 24, and the post-processing manager 101 determines which of the 24 proximate DC values 0-11 and 13-24 to utilize in the strong filtering operation. To make this determination, the post-processing manager 101 determines 501, 503 for each proximate DC value whether the variance of its corresponding block is less than the variance threshold and whether the absolute difference between the proximate DC value and DC value 12 is less than the DC threshold. If so, that proximate DC value is used 507 in the strong filtering operation applied 405 to DC value 12.

It is to be understood that the specific strong filtering operation to apply, including whether the operation requires determining which proximate values to use therein and the manner in which to use them, is a design choice. Various strong filtering operations are known, including but not limited to an adaptive strong five by five average filter. In some embodiments of the present invention, other strong filtering operations are applied as desired. Where an adaptive strong five by five average filter is applied to a DC image 103 as described above, the smoothing takes place in the flat regions and does not occur at the edge boundaries or textures, thus preserving image details. The strength of the smoothing filter depends on the local variance and DC gradient within the region of support of the filter. The computational complexity of this strong filtering operating as used within the present invention is comparable to the MPEG4 deblocking algorithm, whereas the perceptual quality of the result is better.

For the example illustrated in FIG. 6, determining whether to apply the strong filter, determining which proximate DC values to use therein, and applying an adaptive strong five by five average filter as appropriate, is illustrated by the pseudo code fragment in table 2, in which DC values 0-24 are represented as DC[COUNT] where COUNT is equal to the specific DC value, variances of blocks corresponding to DC values 0-24 are represented by V[COUNT], the variance threshold value is represented by VARTh, the DC threshold value is represented by DCTh, an accumulator of DC values is represented by ACC, a counter of DC value number is represented by COUNT and the number of proximate DC values to process is represented by NO_OF_BLOCKS.

TABLE 2

```
IF (V[12] < VARTh) THEN
{
   ACC = 0
   COUNT = 0
   WHILE (COUNT < NO_OF_BLOCKS)
   {
      IF (V[COUNT] < VARTh AND |DC[12] – DC[COUNT]| < DCTh)
      {
         ACC = ACC + DC[COUNT]
```

TABLE 2-continued

```
        COUNT = COUNT + 1
     }
  }
  DC[12] = ACC / COUNT
}
```

It will be apparent to those of ordinary skill in the relevant art in light of this specification that the post-processing manager 101 can use filtered DC values in subsequent strong filtering operations.

It will also be apparent those of ordinary skill in the relevant art in light of this specification that in various embodiments of the present invention the post-processing manager 101 can apply only a weak filtering operation to the DC image 103, only a strong filtering operation, or both a weak and a strong filtering operation as desired.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for improving block based reconstructed image quality, the method comprising:
   dividing a reconstructed image that was encoded using block based processing into non-overlapping blocks of a specified size using a hardware post-processing manager;
   creating a DC image by computing a DC value of each block, wherein the DC image consists of components having a zero frequency;
   creating a zero mean image by subtracting the DC value of each block from the corresponding pixels of that block, wherein the zero mean image consists of low-frequency and high-frequency components having a non-zero frequency;
   for each DC value in the DC image in response to an absolute difference between the DC value and each of a specified number of proximate DC values being less than a specified threshold value applying a weak filtering operation to that DC value using the hardware post-processing manager in order to reduce blocking artifacts; and
   creating a corrected image by adding the filtered DC image to the zero mean image.

2. The method of claim 1 wherein:
   the weak filtering operation comprises application of a five taps cross average filter.

3. The method of claim 1 further comprising:
   computing a variance of each block of the reconstructed image; and
   wherein filtering the DC image further comprises:
      for each DC value in the DC image, determining whether the variance of the corresponding block in the reconstructed image is less than a specified variance threshold; and
      applying a strong filtering operation to a specific DC value in response to the variance of the corresponding block being less than the variance threshold.

4. The method of claim 3 wherein the strong filtering operation further comprises:
   for each of a specified number of DC values proximate to the DC value to which the strong filtering operation is being applied, in response to the variance within the corresponding block in the reconstructed image being less than the specified variance threshold and an absolute difference between the DC value to which the strong filtering operation is being applied and the proximate DC value being less than a specified DC threshold, utilizing that proximate DC value in the strong filtering operation.

5. The method of claim 3 wherein:
   the strong filtering operation comprises application of an adaptive strong five by five average filter.

6. The method of claim 1, further comprising:
   applying a strong filtering operation to at least one DC value in order to smooth luminance transitions in a flat region, in response to a variance of a corresponding block of the reconstructed image being less than a variance threshold.

7. A computer readable medium having a computer program encoded thereon, the computer program for:
   dividing a reconstructed image that was encoded using block based processing into non-overlapping blocks of a specified size;
   creating a DC image by computing a DC value of each block, wherein the DC image consists of low-frequency and high-frequency components having a zero frequency;
   creating a zero mean image by subtracting the DC value of each block from the corresponding pixels of that block, wherein the zero mean image consists of components having a non-zero frequency;
   for each DC value in the DC image in response to an absolute difference between the DC value and each of a specified number of proximate DC values being less than a specified threshold value, applying a weak filtering operation to that DC value, in order to reduce blocking artifacts; and
   creating a corrected image by adding the filtered DC image to the zero mean image.

8. The computer readable medium of claim 7, wherein the computer program further comprises: applying a weak filtering operation in the form of a five taps cross average filter.

9. The computer readable medium of claim 7, wherein the computer program further comprises:
   computing a variance of each block of the reconstructed image; and
   wherein the computer program code for filtering the DC image further comprises:

for each DC value in the DC image, determining whether the variance of the corresponding block in the reconstructed image is less than a specified variance threshold; and applying a strong filtering operation to a specific DC value in response to the variance of the corresponding block being less than the variance threshold.

10. The computer readable medium of claim 9 wherein applying the strong filtering operation further comprises:

for each of a specified number of DC values proximate to the DC value to which the strong filtering operation is being applied, in response to the variance within the corresponding block in the reconstructed image being less than the specified variance threshold and an absolute difference between the DC value to which the strong filtering operation is being applied and the proximate DC value being less than a specified DC threshold, utilizing that proximate DC value in the strong filtering operation.

11. The computer readable medium of claim 9, wherein the computer program further comprises:

applying a strong filtering operation in the form of an adaptive strong five by five average filter.

12. The computer readable medium of claim 7, further comprising:

applying a strong filtering operation to at least one DC value in order to smooth luminance transitions in a flat region, in response to a variance of a corresponding block of the reconstructed image being less than a variance threshold.

13. A computer system for improving block based reconstructed image quality, the computer system comprising:

a post-processing manager; and a computer readable medium having a computer program encoded thereon coupled to the post-processing manager the computer program configured to be executed by the post-processing manager to cause the post-processing manager to perform a method comprising the steps of: dividing a reconstructed image that was encoded using block based processing into non-overlapping blocks of a specified size;

creating a DC image by computing a DC value of each block, wherein the DC image consists of components having a zero frequency;

creating a zero mean image by subtracting the DC value of each block from the corresponding pixels of that block, wherein the zero mean image consists of low-frequency and high-frequency components having a non-zero frequency;

for each DC value in the DC image in response to an absolute difference between the DC value and each of a specified number of proximate DC values being less than a specified threshold value, applying a weak filtering operation to that DC value, in order to reduce blocking artifacts; and creating a corrected image by adding the filtered DC image to the zero mean image.

14. The computer system of claim 13, wherein the weak filtering operation comprises:

a five taps cross average filter.

15. The computer system of claim 13, wherein the computer program configured to be executed by the post-processing manager further causes the post-processing manager to perform the steps of:

computing a variance of each block of the reconstructed image; and for each DC value in the DC image, determining whether the variance of the corresponding block in the reconstructed image is less than a specified variance threshold; and applying a strong filtering operation to a specific DC value in response to the variance of the corresponding block being less than the variance threshold.

16. The computer system of claim 15, wherein the computer program configured to be executed by the post-processing manager further causes the post-processing manager to perform the steps of:

for each of a specified number of DC values proximate to the DC value to which the strong filtering operation is being applied, in response to the variance within the corresponding block in the reconstructed image being less than the specified variance threshold and an absolute difference between the DC value to which the strong filtering operation is being applied and the proximate DC value being less than a specified DC threshold, utilizing that proximate DC value in the strong filtering operation.

17. The computer system of claim 15, wherein the computer program configured to be executed by the post-processing manager further causes the post-processing manager to perform the step of:

applying a strong filtering operation in the form of an adaptive strong five by five average filter.

18. The computer system of claim 13, wherein the computer program configured to be executed by the post-processing manager further causes the post-processing manager to perform the step of:

applying a strong filtering operation to at least one DC value in order to smooth luminance transitions in a flat region, in response to a variance of a corresponding block of the reconstructed image being less than a variance threshold.

19. A computer system for improving block based reconstructed image quality, the computer system comprising:

means for dividing a reconstructed image that was encoded using block based processing into non-overlapping blocks of a specified size;

means for creating a DC image by computing a DC value of each block, wherein the DC image consists of low-frequency and high-frequency components having a zero frequency;

means for creating a zero mean image by subtracting the DC value of each block from the corresponding pixels of that block, wherein the zero mean image consists of components having a non-zero frequency;

means for, for each DC value in the DC image in response to an absolute difference between the DC value and each of a specified number of proximate DC values being less than a specified threshold value applying a weak filtering operation to that DC value in order to reduce blocking artifacts; and means for creating a corrected image by adding the filtered DC image to the zero mean image.

20. The computer system of claim 19 further comprising:

means for applying a weak filtering operation in the form of a five taps cross average filter.

21. The computer system of claim 19 further comprising:

means for computing a variance of each block of the reconstructed image;

means for, for each DC value in the DC image, determining whether the variance of the corresponding block in the reconstructed image is less than a specified variance threshold; and means for applying a strong filtering operation to a specific DC value in response to the variance of the corresponding block being less than the variance threshold.

22. The computer system of claim 21 further comprising:
means for, for each of a specified number of DC values proximate to the DC value to which the strong filtering operation is being applied, in response to the variance within the corresponding block in the reconstructed image being less than the specified variance threshold and an absolute difference between the DC value to which the strong filtering operation is being applied and the proximate DC value being less than a specified DC threshold, utilizing that proximate DC value in the strong filtering operation.

23. The computer system of claim 21 further comprising:
means for applying a strong filtering operation in the form of an adaptive strong five by five average filter.

24. The computer system of claim 19 further comprising:
means for applying a strong filtering operation to at least one DC value in order to smooth luminance transitions in a flat region, in response to a variance of a corresponding block of the reconstructed image being less than a variance threshold.

* * * * *

UNITED STATES PATENT AND TRADEMARK OFFICE
CERTIFICATE OF CORRECTION

PATENT NO. : 7,616,829 B1
APPLICATION NO. : 10/697447
DATED : November 10, 2009
INVENTOR(S) : Bilbrey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Nineteenth Day of October, 2010

David J. Kappos
*Director of the United States Patent and Trademark Office*